United States Patent

[11] 3,615,992

[72] Inventors Robert Jeffries
East Hanover;
Martin M. Grover, Upper Montclair, both of N.J.
[21] Appl. No. 720,868
[22] Filed Apr. 12, 1968
[45] Patented Oct. 26, 1971
[73] Assignee PPG Industries, Inc.
Pittsburgh, Pa.

[54] METHOD OF PRODUCING ADHESIVE PRODUCTS
7 Claims, 2 Drawing Figs.
[52] U.S. Cl. ................................................ 156/154, 156/153, 156/230, 156/249, 117/8, 117/11, 117/68.5
[51] Int. Cl. .................................................. C09j 7/02
[50] Field of Search ...................................... 156/153, 154, 230, 249; 117/8, 68.5, 11

[56] References Cited
UNITED STATES PATENTS
3,087,850 4/1963 Cole .......................... 156/230
2,191,704 2/1940 Bennett ....................... 156/230
2,607,711 8/1952 Hendricks ................... 156/249
2,816,655 12/1957 Crozier et al. .............. 117/68.5
2,829,073 4/1958 Williams ..................... 117/68.5
3,341,348 9/1967 Letendre ..................... 177/8
FOREIGN PATENTS
817 9/1853 Great Britain ............... 156/154

Primary Examiner—Carl D. Quarforth
Assistant Examiner—Brooks H. Hunt
Attorney—Chisholm and Spencer ABSTRACT: Method of forming a composite adhesive products in roll form are provided by coating a film adhesive onto one side of double-coated release paper, abrading the other surface of the release paper and partially removing the release coating therefrom, and winding the product in roll form. These products are useful in a process in which a pressure-sensitive adhesive tape is applied to the abraded surface of the release paper, thereby making separation of the release paper from the adhesive easily accomplished during use.

INVENTORS
ROBERT JEFFRIES
MARTIN M. GROVER

BY

ATTORNEYS

METHOD OF PRODUCING ADHESIVE PRODUCTS

BACKGROUND OF THE INVENTION

A growing method of bonding various articles in industrial operations involves the use of film adhesives. These are essentially dry films of an adhesive composition without a permanently adherent backing. The adhesive may or may not be normally tacky and can be either unsupported, i.e., composed entirely of the adhesive, or supported on a carrier web. Supported films include for example, very thin tissue paper impregnated with the adhesive, or randomly dispersed fibers disposed in a thin layer of the adhesive. Thin nonporous films can be coated on both surfaces to provide other film adhesives. Film adhesives are used by applying one surface to an adherend member to provide the member with an adherent adhesive coating; the adherend member can then or later be bonded to a surface by means of the adhesive layer.

Film adhesives are generally produced by coating a layer of liquid film-forming adhesive composition onto a nonadherent surface and allowing the adhesive to dry to form a film. Where a carrier web is used to provide a supported film, the carrier can be impregnated while on the nonadherent surface or the carrier can be impregnated with the adhesive composition and then placed on the nonadherent material. In some cases the drying of the adhesive is merely evaporation of the solvent, while in other instances some chemical reaction may be involved and take place during the drying step or later.

In order to permit handling of film adhesives, it is necessary to interleave the adhesive film with a nonadherent material. Usually there is employed for this purpose a double-coated release paper; in most cases the release paper also forms the nonadherent surface onto which the liquid film-forming adhesive composition is coated. Such release paper is sheet material coated on both sides with a release coating, that is, a coating that does not permanently adhere to ordinary adhesives. Such release coatings are well known in the art.

While the release coating does not permanently adhere to the adhesive film, some light adhesion does develop during the drying process and this adhesion tends to increase with the passage of time. This is particularly true where the adhesive is formed on the release paper. Since film adhesives are designed for use some time after they are produced, the removal of the release paper becomes a troublesome and time-consuming problem, especially in automated or production line industrial operations.

One type of process utilizing film adhesives is in the application of an adhesive to members, such as plates, escutcheons, trim members and similar articles made of thin metal, plastic or the like. In such processes the plate or trim member is pressed onto an exposed surface of the film adhesive and the adhesive is stamped or otherwise cut out in the shape of the member to provide an individual composite article in which the member has an adherent adhesive coating, the release paper remaining on the other side of the adhesive layer. This product is then bonded to various surfaces by first removing the release paper. The above-mentioned problem of removal of the release paper is thus encountered and is particularly troublesome because of the pressure applied during the stamping or cutting of the plate or trim member.

One method of overcoming the above problem is to employ a film adhesive coated on single-coated release paper, i.e., release paper which has a release coating only on the side with which the adhesive is in contact and which has no release coating on the opposite side. Removal of the release paper would then be facilitated by applying the uncoated side of the release paper to a pressure-sensitive adhesive tape to permit removal of the release paper along with the tape. However, this procedure is effective in permitting easier removal of the release paper, but has a number of disadvantages. For instance, film adhesives are ordinarily sold in roll form and in order to roll such an adhesive coated on single-coated release paper, it is necessary to use an additional sheet of release paper between the layers to prevent blocking of the adhesive. This is not only expensive, but it makes it extremely difficult to wind the product into a satisfactory roll and also involves an extra step in the use of the film adhesive.

BRIEF SUMMARY OF THE INVENTION

The present invention provides a film adhesive in roll form which can be employed in the above process wherein a pressure-sensitive adhesive tape is applied, but which does not require additional release paper. The invention also provides an overall method of producing an adhesive-backed substrate from which the release paper is easily removed by use of the pressure-sensitive tape but without the disadvantages described above.

The invention is predicated upon the discovery that the release coating on one side of double-coated release paper having a film adhesive on the other side can be abraded to at least partially remove the release coating without damaging the film adhesive. Further, it has been found that by abrading the release coating, a surface is provided which retains the necessary release characteristics to permit winding and unwinding of the product in roll form, without an additional interleaved release paper, while at the same time providing preferential adhesion to a pressure-sensitive adhesive tape applied thereto. Thus, one can produce the film adhesive in roll form, ship it or store it for reasonable periods, and then employ it in an overall process as described above. Alternatively, one can remove all or part of the release coating from one side of the release paper as one step of the overall process of producing an adhesive-backed product having thereon a pressure-sensitive adhesive tape. X

BRIEF DESCRIPTION OF THE DRAWINGS

The drawings herein illustrate two embodiments of the invention.

DETAILED DESCRIPTION OF THE INVENTION

Figure 1:
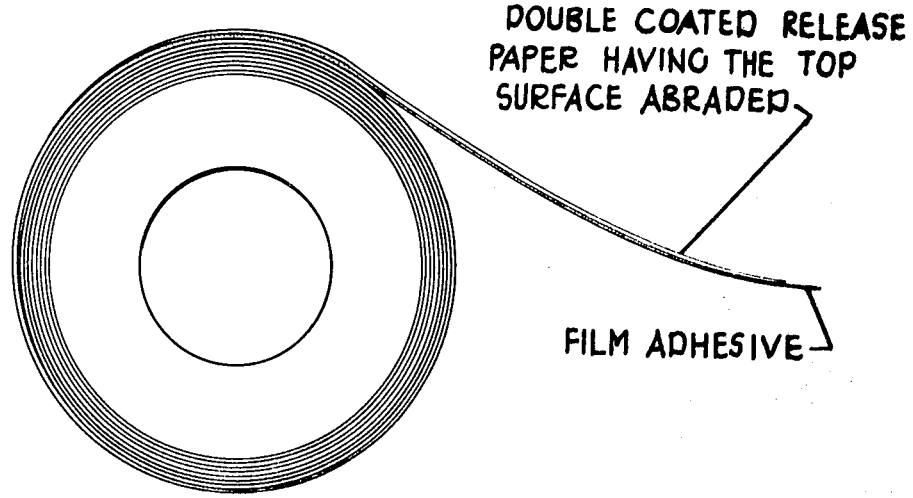
FIG. 1 shows a film adhesive in roll form in which the adhesive film is interleaved with double-coated release paper which has been abraded on the surface opposite the adhesive, whereby the release coating is partially removed to permit winding and unwinding of the composite product.
Figure 2:
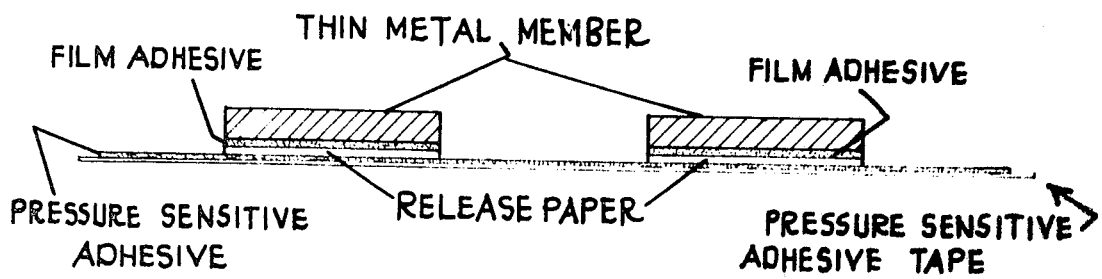
FIG. 2 shows a sheet of pressure-sensitive adhesive tape having thereon two adhesive-backed thin metal members, such as nameplates. These metal members have the composite product shown in FIG. 1 on one side, including the film adhesive in adherent contact with the metal and the abraded release paper interposed between the film adhesive and the pressure-sensitive adhesive, the abraded surface being in contact with the pressure-sensitive adhesive.

The method by which a composite adhesive product in roll form is obtained in accordance with the invention comprises the steps of 1. providing a film adhesive in contact with a first major surface of sheet material having a release coating on both major surfaces thereof,
2. abrading the other major surface of the sheet material to partially remove the release coating therefrom, and
3. winding the product from step (2) into roll form.

It may be noted that the order of the steps can be varied somewhat. For example, the abrading step can be carried out prior to the coating of the adhesive film. The film adhesive is ordinarily coated as a liquid composition onto the release paper and then dried to form a film; in some cases, however, the film adhesive is first formed and then applied to the release paper.

Release papers of various types can be employed in the invention and essentially any material having release coating on both major surfaces can be utilized. Typical release papers are prepared by slightly impregnating and completely coating the surface of the paper with a composition which resists the adhesion of ordinary adhesives. A number of such release coatings are known in the art, among them being cured silicones, cured blends of alkyd resins and urea-formaldehyde resins and stearato chromic chloride (e.g., "Quilon").

The invention is also applicable to essentially any film-forming adhesive composition which forms a film as described. A number of such adhesives are known, typical examples include blends of butadiene-acrylonitrile copolymers with resins such as oil-soluble, heat-hardening phenol-formaldehyde resins, two-step thermosetting phenolic resin compositions, coumarone-indene resins, polyterpene resins, and the like; polychloroprene combined with heat-hardening phenol-formaldehyde resins, rosin-phenol resins, coumarone-indene resins, etc., vinyl alkyl ether polymer based adhesives, as described in U.S. Pat. No. 3,280,217; thermoplastic styrene-butadiene block polymer rubbers mixed with resins such as those described; and other such adhesive compositions.

The thickness of the adhesive film is not critical to the present invention; ordinarily such film adhesives are from about 1 mil to about 20 mils in thickness. As indicated above, the adhesive can be dried by simple evaporation (at room temperature or at elevated temperatures) or by chemical reaction or curing. In most cases, heating of the adhesive film is employed, temperatures of from about 150° F. to about 350° F. being typical.

The abrading of the release coating can be carried out using an abrasive material, such as sandpaper or emery paper, or by scraping with a knife edge, or by any other similar means, such as wire brushing. In small scale operations the abrasion can be carried out in a manual operation, but the abrading process can also be carried out on continuous equipment. For example, the coated release paper can be passed over abrasive rolls which are either stationary or turning counter to the direction the release paper is traveling. Alternatively, the abrasive surface can be flat and the release paper passed over it under a low bearing pressure. A series of knife edges, either contoured or canted at an angle so that the release paper is scraped and not cut, can be employed, as can rotating wire brushes. During or following the abrasion, it is desirable to remove the dust which is formed. This can be accomplished, for example, by applying suction and/or wiping with wet cloth or rolls, and by other means of similar effect.

The extent of abrasion necessary in order to permit the utilization of the film adhesive in roll form is such as to only partially remove the release coating and in general sufficient so that the release paper retains its resistance to adhesion of the dry film adhesive while at the same time permitting a degree of adhesion to ordinary pressure-sensitive adhesives, i.e., more adherent to the pressure-sensitive tape than to the film adhesive. The entire surface can be abraded, or the surface can be abraded in a noncontinuous pattern. For instance, the release coating can be entirely or partially removed form some areas on a striped or other pattern and not removed at all from other portions of the surface.

While the actual extent of abrading and removal of the release coating varies with the particular release coating, adhesive, etc., it is not difficult to attain the desired characteristics in the final product since the types of adhesives between which preferential adhesion is to be achieved are different. Furthermore, abrading of the release surface provides a unique type of surface which differs, for instance, from a similar paper with no release coating or containing only a small amount of release coating. This is believed due to the microrough surface imparted, which has increased surface area as compared to unabraded release paper, and to the exposure of some areas of untreated paper because of the abrasion. Thus, the surface retains its resistance to adhesion of the dried film adhesive upon ordinary contact, while at the same time permitting good adhesion to pressure-sensitive adhesives which are pressed onto the surface.

As mentioned above, the invention can be employed as part of an overall process of producing an adhesive-backed product containing a pressure-sensitive adhesive tape in adherent contact with the release paper, which is in turn protecting the film adhesive attached to a substrate. Such an overall process comprises the steps of 1. providing a roll of film adhesive interleaved with sheet material having both major surfaces coated with release coating.

2. at least partially removing the release coating from the surface of the sheet material which is not in contact with the adhesive, whereby the surface has improved adhesion when contacted with a normally tacky pressure-sensitive adhesive, 3. applying the surface of the film adhesive which is opposite that in contact with the release paper to an adherend member, whereby the adhesive is adherently bonded to the member, 4. cutting the adhesive film to conform substantially to the shape of the adherend member, and 5. pressing a normally tacky, pressure-sensitive adhesive tape against the surface of the release paper from which the release coating has been at least partially removed.

Optionally, and depending, for example, upon whether the product is to be used immediately or at some later time, the final product can be cut and/or wound into roll form.

In the above process, one can employ a film adhesive roll interleaved with abraded release paper, as described above, which is then used in step (3). However, in some cases film adhesives in roll form, interleaved with untreated double-coated release paper, are employed in step (1); if this is the case the extent of removal of the release coating is not as important and all of the release coating can be removed from the exposed surface if desired.

While the preferred procedure for removal of the release coating in the overall process thus described is the abrading process discussed above, it is possible in some cases to achieve all or part of the removal by contact with a solvent. This can be carried out where the release coating is not completely cured and insoluble, and ordinarily only a part of the release coating is removed in this manner. Release coatings to which this procedure is applicable include certain cured organopolysiloxanes and other resins and thermoplastic coatings such as vinyl stearate-vinyl acetate copolymers. The solvent employed depends on the release coating; aromatic hydrocarbons such as toluene and xylene can be used with silicones and other resins. Other solvents include ketones, esters, etc. The procedure is carried out by applying the solvent to the coating with a wiping action; felt rolls saturated with the solvent provide one means of carrying out the removal in this manner.

The adherend member to which the adhesive film is bonded in step (3) can be of any suitable material, including metals, glass, plastics, wood, cardboard, etc. One type of member to which the invention is particularly applicable comprises thin steel, aluminum or plastic articles in the form of plates, escutcheons, trim members and the like.

The cutting step (step(4)) is usually carried out by stamping out the adhesive film in the shape of the member. This is necessary in order to permit later application of the member to a substrate, and in the usual case the release paper is also cut in the same shape at the same time. The stamping or other cutting process contributes to the problem of removal of the release, not only because of the cutting of the release paper but also because the cutting applies pressure around the periphery of the adhesive-backed article, thus more tightly adhering the release paper to the adhesive.

The pressure-sensitive adhesive tape employed in step (5) includes any flexible sheet material having thereon an adherent coating of a normally aggressively tacky pressure-sensitive adhesive. Such tapes are well known in the art and generally contain natural or synthetic rubber along with, in many cases, a tackifying resin such as resinous rosin esters and beta-pinene resins. The flexible sheet material employed as the backing is typically kraft or a similar paper, cotton fabric, vinyl halide resin sheet, Mylar, cellophane or the like. Examples of pressure-sensitive adhesive tapes are described in U.S. Pat. Nos. 2,319,959, 2,410,079, 2,884,106, 2,925,174, 3,089,786, 3,100,160, 3,102,102 and 3,268,357.

As indicated above, the product which is obtained in the above-described method has unique characteristics due to the abraded surface as described and differs from that which is obtained by use of an uncoated release paper or a release paper coated with a controlled or very small amount of release material. Although the exact nature of these differences are not clearly understood, it is believed that they are related to the roughness and increased surface area and the exposure of untreated fibers provided by the abrasion step.

The invention will be described further in connection with the following examples. These examples, however, are not to be construed as limitations upon the invention but only as being illustrative thereof. All parts and percentages in the examples and throughout the specification are by weight and are based upon nonvolatile solids content unless otherwise indicated.

EXAMPLE 1

This example illustrates the method of producing a composite adhesive product in roll form. The following liquid adhesive composition is coated onto double-coated release paper:

|  | Parts by Weight |
| --- | --- |
| NBR rubber * | 40.0 |
| Thermosetting phenol-aldehyde resin ** | 28.0 |
| Vinyl resin *** | 10.0 |
| Methyl ethyl ketone | 182 |

* Butadiene-acrylonitrile copolymer containing about 42 percent acrylonitrile ("Hycar 1001")

** Alkaline-catalyzed resole lump resin, sold as "CKR-2620"

*** Copolymer of 86 percent vinyl chloride, 13 percent vinyl acetate and 1 percent maleic anhydride ("Vinylite VMCH")

The release paper is 60 pound parchmentized kraft paper coated on the side to which the adhesive is applied with an organopolysiloxane emulsion ("Syloff 22") and cured with an organotin salt ("Syloff 22A") for 7.5 seconds at 350° F. and on the other side with the same organopolysiloxane emulsion composition cured for 15 seconds at 350° F. The paper is known as "Daubert 60 VP, 1 and 1D." The above adhesive composition is applied at a weight of about 55 pounds/ream; it is dried at 150° F. for 35 minutes followed by 5 minutes at 275° F. The product is wound into roll form.

The release coating on the side opposite the adherent adhesive layer of the above product is abraded by passing 120 grit emery cloth over the surface with a pressure of about 0.6 p.s.i. two times at a speed of approximately 40 feet per minute. During the abrasion the loose dust formed is removed by suction and following the abrasion the surface is wiped with a water-moistened felt roll. The release coating is partially removed but the adhesive film remains intact; the abraded surface of the product has a roughened texture which has reduced adhesion to the film adhesive, thus permitting it to be wound and unwound, but which adheres well to pressure-sensitive adhesive tapes. The adhesive-paper composite is wound into roll form to provide the desired product and can easily be unwound for reasonable periods, sufficient to permit its shipment and use in commerce, without damage to the adhesive film.

EXAMPLE 2

This example illustrates the overall process of producing a product having a pressure-sensitive adhesive tape backing.

A roll of film adhesive interleaved with release paper which has been abraded on one side is made as described in example 1. This roll is unwound (no blocking is encountered) and nameplates are laid onto the surface of the adhesive film and passed through squeeze rolls heated to about 350° F. The nameplates are thin, flexible aluminum panels 6 inches by 1 inch and can be printed as desired. The panels having the film adhesive-release paper composite adhered thereto are stamped out to provide individual adhesive-backed nameplates. These are then laid on a sheet of pressure-sensitive adhesive tape with the abraded surface of the release paper in contact with the pressure-sensitive adhesive. The pressure-sensitive adhesive tape used is kraft paper having a 2-mil (dry) adhesive layer, the adhesive being a blend of 38 parts of poly(vinyl ethyl ether) having a reduced viscosity of 4.75, 110 parts of an interpolymer of 60 percent 2-ethylhexyl acrylate, 28 percent ethyl acrylate, 7 percent vinyl acetate, 2 percent methacrylic acid and 3 percent 2-hydroxypropyl methacrylate, and 54 parts of heat-hardenable phenolic resin (CKR-1634).

The product can be wound into roll form, if desired, or cut into sheets and stacked. In utilizing the product the release paper is easily removable by peeling off the pressure-sensitive tape, this being readily accomplished because the adhesion between the abraded release paper and the pressure-sensitive tape is greater than the adhesion between the coated surface of the release paper and the adhesive film.

EXAMPLE 3

An adhesive film is produced on double-coated release paper, as described in example 1, and wound into a roll. The release coating is then partially removed from the exposed surface of the release paper by wiping the horizontal surface with paper towelling saturated with toluene, using six strokes at a bearing pressure of about 5 p.s.i. The surface is then allowed to air dry and nameplates are applied to the adhesive and stamped out, as described in example 2. The solvent-treated surface of the release paper is then laid on a pressure-sensitive adhesive tape to provide a composite assembly. The tape employed is a masking tape containing a layer of pressure-sensitive adhesive composed of equal parts of natural rubber and pentaerythritol ester of stabilized rosin on creped reinforced kraft paper. The pressure-sensitive tape adheres well to the surface of the release paper and permits easy removal of the release paper when desired.

EXAMPLE 4

The following composition is employed to form a film adhesive:

|  | Parts by Weight |
| --- | --- |
| Butadiene-acrylonitrile copolymer (about 30 percent acrylonitrile - "Hycar 1022") | 100 |
| Oil-soluble, heat hardenable phenolic resin * | 50 |
| Thermosetting phenol-aldehyde composition ** | 25 |
| Dioctyl sebacate | 5 |
| Methyl ethyl ketone | 750 |

*Alkaline-catalyzed condensate of p-t-butyl phenol and excess formaldehyde ("CKR-1634")

** Acid-catalyzed thermoplastic phenol-aldehyde resin blended with 8 percent by weight of hexamethylenetetramine ("Durez 7031")

This composition is coated onto the release paper described in example 1 at a weight of 55 lbs./ream, dried at 160° F. for 7 minutes at 270° F., and wound into a roll.

The roll is unwound and the release coating on the surface opposite the adhesive is abraded by passing 120 grit emery cloth over the surface at a pressure of about 0.5 p.s.i. four times at a speed of approximately 50 feet per minute. The loose dust formed is removed by suction and wiping. There are then applied to the adhesive surface a thin flexible aluminum sheet and individual panels of the aluminum-adhesive-release paper are stamped out. These are then laid on a sheet of pressure-sensitive adhesive tape, as described in example 2. The product is easily used by removing the release paper along with the pressure-sensitive tape.

EXAMPLE 5

Example 4 is repeated except that the abrasion step is carried out so as to remove essentially all of the release coating on the abraded side. The abraded paper-adhesive assembly is used to produce the adhesive-backed product in the manner described.

EXAMPLE 6

Example 4 is repeated using 29-mil-thick rigid vinyl sheet, made of poly(vinyl chloride) resin containing low plasticizer content, instead of the aluminum nameplate. A quite useful film adhesive in this case is a combination of 100 parts of an interpolymer of 20 percent 2-ethylhexyl acrylate, 40 percent butyl acrylate and 40 percent vinyl acetate. The adhesive film is dried at 150° F. for 2 minutes and then 275° F. for 2 minutes to provide a 2-mil-thick dry film. The product is easily utilized in the manner described.

In a manner similar to those above, satisfactory results are obtained using other abrading techniques, such as wire brushing or removal of the release coating in a noncontinuous pattern, and other types of release coatings, such as other cured silicones and stearato chromium salt complexes (e.g., "Quilon" coatings). Also other types of film adhesives and other pressure-sensitive adhesive tapes can be employed to produce substantially equivalent products for many purposes.

According to the provisions of the patent statutes, there are described above the invention and what are now considered to be its best embodiments. However, within the scope of the appended claims, it is to be understood that the invention can be practiced otherwise than as specifically described.

We claim:

1. A method of producing a composite adhesive product in roll form comprising the steps of
   1. interleaving a film adhesive with sheet material having release coating on both major surfaces, whereby said film adhesive is in contact with a first major surface of said sheet material,
   2. abrading the second major surface of said sheet material to partially remove the release coating therefrom, and
   3. winding the product into roll form.

2. The method of claim 1 in which said film adhesive is provided by coating a liquid film-forming adhesive composition onto the first major surface of said sheet material and drying said adhesive composition while in contact with said release paper.

3. A method of producing an adhesive-backed product comprising the steps of
   1. interleaving a film adhesive with release paper comprising sheet material having release coating on both major surfaces, whereby said film adhesive is in contact with a first major surface of said release paper,
   2. at least partially removing the release coating from the second major surface of said release paper,
   3. applying the surface of said film adhesive opposite that which is in contact with the release paper to an adherend member whereby said adhesive is adherently bonded to said member,
   4. cutting the adhesive film to conform substantially to the shape of said adherend member, and
   5. applying the said second surface of the release paper to a normally tacky pressure-sensitive adhesive tape.

4. The method of claim 3 in which the product obtained from step (5) is wound into roll form.

5. The method of claim 3 in which said adherend member is a thin metal or plastic member.

6. The method of claim 3 in which the release coating is at least partially removed by abrading the surface thereof.

7. The method of claim 3 in which the release coating is at least partially removed by contact with a solvent for the release coating.

* * * * *